March 10, 1970 F. D. CASSIDY 3,500,360
RANDOM-ACCESS MEMORY ORGANIZATION
Filed March 13, 1967
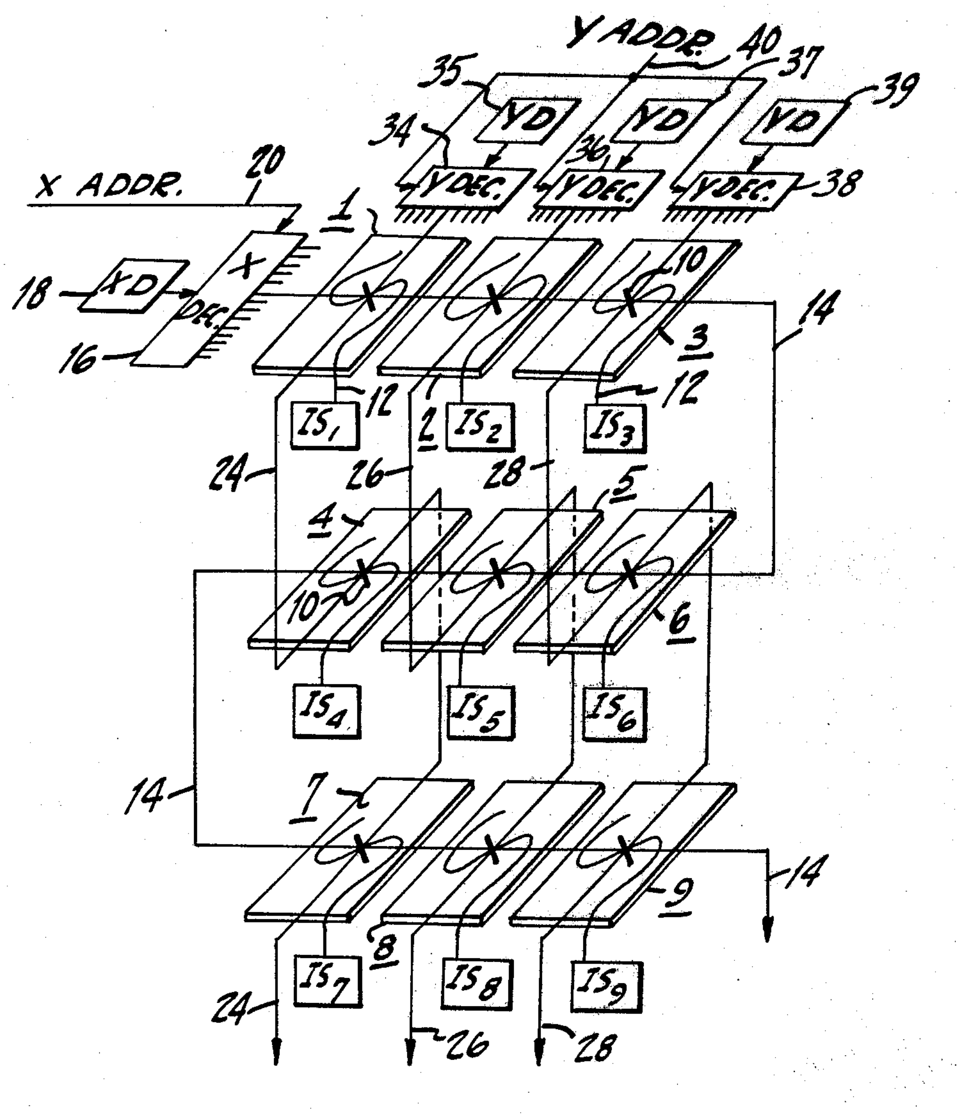
INVENTOR
Francis D. Cassidy
BY Carl V. Olson
ATTORNEY United States Patent Office 3,500,360
Patented Mar. 10, 1970

3,500,360

RANDOM-ACCESS MEMORY ORGANIZATION

Francis D. Cassidy, Townsend, Mass., assignor to RCA Corporation, a corporation of Delaware Filed Mar. 13, 1967, Ser. No. 622,603
Int. Cl. G11b *5/00*
U.S. Cl. 340—174 6 Claims

ABSTRACT OF THE DISCLOSURE

The random-access memory organization disclosed differs from three-dimensional and two-and-a-half dimensional organizations, but possesses some features and advantages of both. There are as many bit arrays as there are bits in the words to be stored, and each bit array contains as many memory elements as there are words. A half-select current is supplied to memory elements located in the first plane through the stack, and half-select currents are applied to a plurality of orthogonal planes through the stack, to fully select the memory elements located at the intersections of the first plane with the plurality of orthogonal planes. The memory organization permits various sizes of memories to be constructed with advantageous performance and cost characteristics.

BACKGROUND OF INVENTION

Random-access memories are commonly constructed of arrays of magnetic memory elements, such as cores, arranged to store many words each including many bits. Any one word storage location can be accessed at a time for the reading or writing of all bits of a word of information. Known memory organizations include a two-dimensional or word-organized memory in which any one of many word lines is selected to access all of the bit locations along the selected line. A three-dimensional or coincident-current memory is one in which a half-select current is supplied to corresponding row conductors of all memory planes of a stack, and a half-select current is supplied to corresponding column conductors of all memory planes of the stack. One memory element in each plane at the crossover of the energized row and column conductors is thus fully selected for reading, and then, later, for writing. A so-called two-and-a-half dimensional memory is arranged to operate like a three-dimensional memory for reading and like a two-dimensional memory for writing.

The various memory organizations differ in the relative complexity and cost of their selection electronics portions and their magnetic core stack portions. They differ also in operating speed. Further, their relative characteristics vary in accordance with memory size, i.e., information storage capacity.

It is a general object of the present invention to provide a memory organization which, at least in certain intermediate memory sizes, has particularly advantageous speed, performance and cost characteristics.

BRIEF SUMMARY OF INVENTION

In accordance with an example of the invention there is provided a random-access memory organization for the storage of *m* words each having *n* bits. A separate bit array of *m* memory elements is provided for each of the *n* bits. Each bit array is linked by *x* row drive conductors and *y* column drive conductors, where the product of *x* and *y* equals *m*. Means are provided to select and drive any one of the *x* drive conductors in all *n* of the bit arrays. The bit arrays are divided into *z* groups, and each group is provided with separate means to select and drive any one of the *y* drive conductors in the respective group. Finally, *n* inhibit-sense means are provided each linked with all memory elements of a respective bit array.

BRIEF DESCRIPTION OF DRAWING

The sole figure of the drawing is a perspective view of a simplified version of a memory organization constructed according to the teachings of the invention.

DETAILED DESCRIPTION

Referring now in greater detail to the drawing, there is shown a memory which, for purposes of illustration, is capable of storing a large number of words each containing nine information bits in nine memory bit array planes designated 1 through 9. It will be understood that the memory can be extended downwardly to include additional groups of three memory bit array planes, and/or can be extended to the right to include more than three array planes at each level.

Each of the memory bit arrays or planes 1 through 9 includes a rectangular coordinate array of memory elements, such as magnetic cores, the rows of magnetic cores being linked by respective row drive conductors, and the columns of magnetic cores being linked by respective column drive conductors. Each bit array 1 through 9 includes a number *m* of magnetic elements equal to the number of information word storage locations in the memory. There is a number *n* (nine in the illustrated example) of bit arrays 1 through 9 equal to the number of bits in each word storage location in the memory. In the drawing, for clarity of illustration, only one word storage location in the memory is shown. The one word storage location shown is constituted by the magnetic cores 10 at corresponding locations in all of the bit arrays 1 through 9.

All of the memory elements or magnetic cores 10 in each bit array 1 through 9 is linked by a respective inhibit-sense winding 12 coupled to a respective inhibit driver and sense amplifier $IS_1$ through $IS_9$. According to a well-known alternative, each inhibit-sense winding 12 may be constituted by two separate windings, one connected to an inhibit driver, and the other connected to a sense amplifier.

The corresponding row drive conductors of all bit arrays 1 through 9 are connected in series. One such row drive conductor 14 is shown linking all memory elements 10 in the bit arrays 1 through 9. One end of the row conductor 14 is connected to a corresponding output of an X decoder 16. Other row conductors (not shown) are connected to corresponding respective outputs of decoder 16. Decoder 16 receives an input pulse from an X driver 18 and receives an X address input over a multi-conductor address input line 20. The X decoder 16 acts to pass a pulse from the X driver 18 to a particular one of its outputs determined by the address supplied to the decoder over line 20. It will be understood that the address decoding arrangement may be located as shown at one end of all row conductors, or may be located at both ends of the row conductors in the known driver-and-switch arrangement.

In the column direction, the bit arrays 1 through 9 are divided or partitioned into three groups, the first group including bit arrays 1, 4 and 7; the second group including bit arrays 2, 5 and 8 and third group including bit arrays 3, 6 and 9. The number of groups illustrated by way of example is three, but other numbers of groups may be employed and the number of groups may be generally designated $z$.

All corresponding column drive conductors in bit arrays of the first group are connected in series as illustrated by the single illustrated column drive conductor 24. Similarly, the column drive conductors in the second group of bit arrays are connected in the manner of illustrated column drive conductor 26, and the column drive conductors of the third group of bit arrays are connected in the manner of the illustrated column drive conductor 28.

All of the column drive conductors of the first group of bit arrays 1, 4, and 7 are served by a Y decoder 34 and a Y driver 35. Similiarly, the column conductors of the second and third groups of bit arrays are served by respecitve Y decoders 36 and 38 and respective Y drivers 37 and 39. All of the Y decoders 34, 36 and 38 receive the same Y address at the same time over the multi-conductor Y address line 40. The Y driving and decoding arrangement is similar to the X driving and decoding arrangement except that the Y driving and decoding arrangement includes a plurality of simultaneously-operated decoders and drivers equal in number to the number $z$ of groups into which the stack of bit arrays 1 through 9 is divided. The electronic circuitry employed for the X address, driver and decoder, and for the Y address, driver and decoder to accomplish reading out from, and writing into, the memory may be any suitable conventional circuitry such as that described in an article by H. P. Zinschlag entitled "A2½D Integrated Circuit Memory" appearing on pages 26 through 39 of the September 1966, issue of Computer Design.

The bit arrays 1 through 9 are shown as having a rectangular, rather than a square, geometry. Each bit array should preferably include a larger number of row conductors than column conductors. According to the example shown, there preferably should be three times as many row drive conductors through each bit array as there are column drive conductors through each bit array. This results from the fact that the bit arrays 1 through 9 are divided into three groups. The number $x$ of row drive conductors in each bit array should preferably be $z$ times the number $y$ of column drive conductors in each bit array when the bit arrays are divided into $z$ groups. When this rule is followed, each of the drivers 18, 35, 37 and 39 is called upon to drive an equal number of magnetic memory elements. That is, each driver supplies a half-select current pulse to all magnetic cores in a vertical plane through the stack, and the number of magnetic cores in a vertical plane driven by the driver 18 is equal to the number of magnetic cores in the orthogonal vertical planes driven by each of the Y drivers 35, 37 and 39. The memory organization thus possesses the very desirable feature of utilizing driver circuits to best advantage so that memories having a relatively large number of bits per word can be constructed with important economic savings in the selection electronics.

In the operation of the memory organization illustrated, the reading of an information word stored in the memory is accomplished by supplying a half-select current pulse from X driver 18 through X decoder 16 to a selected row drive conductor threaded through the stack. Concurrently, half-select current pulses are supplied from each of Y drivers 35, 37, and 39 through selected corresponding column drive conductors in the three respective groups of bit arrays in the stack. If the row and column drive conductors thus energized are the row drive conductor 14 and the column drive conductors 24, 26 and 28, the additive effect of the two half-select pulses linking all of the selected magnetic cores 10 tends to cause all the selected cores 10 to switch. Each magnetic core 10 that switches, as a result of its previous information-containing magnetic state, induces a sense signal on the respective sense winding 12 which is supplied to and sensed by the corresponding respective sense amplifier.

In the writing of information into the word storage location illustrated, the X driver 18 and the Y drivers 35, 37 and 39 supply half-select current pulses of polarity to reverse the magnetization of all of the cores 10. Concurrently, the reversal of flux in certain ones of the magnetic cores 10 is inhibited by an opposite-polarity inhibit pulse supplied to the inhibit-sense line 12 from respective inhibit drivers. The inhibit drivers operate in response to the "1" or "0" information bits that are desired to be written into the word storage location.

What is claimed is:

1. A random-access memory organization for the storage of $m$ words each having $n$ bits, comprising $n$ bit arrays of $m$ memory elements each linked by $x$ row drive conductors and $y$ column drive conductors, where the product of $x$ and $y$ equals $m$, said $n$ bit arrays being divided into $z$ groups, means to select and drive any one of the $x$ drive conductor in all $n$ of said bit arrays, said means consisting of one driver and one decoder, means to select and drive any one of the $y$ drive conductors in all $z$ of said groups of bit arrays, said means consisting of $z$ decoders and $z$ drivers for respective groups, and $n$ inhibit-sense means each linked with all memory elements of a respective bit array.

2. A memory organization as defined in claim 1 wherein the number $x$ of row conductors in each bit array is $z$ times the number $y$ of column conductors in each bit array.

3. A random-access memory organization for the storage of $m$ words each having $n$ bits, comprising $n$ bit arrays of $m$ memory elements each, each array of memory elements being linked by $x$ row drive conductors and $y$ column drive conductors, where the product of $x$ and $y$ equals $m$, means to select and drive any one of the $x$ drive conductors in all $n$ of said bit arrays, means to select and drive any one of the $y$ drive conductors in all of said bit arrays, and $n$ inhibit-sense means each linked with all memory elements of a respective bit array, wherein the improvement comprises the serial connection of corresponding row drive conductors of all said bit arrays, the partitioning of said bit arrays into a number of groups, the serial connection of corresponding column drive conductors of the bit arrays within each group, and means for the simultaneous energization of corresponding column drive conductors of different groups.

4. A memory organization as defined in claim 3 wherein the ratio of the number $x$ of row conductors to the number $y$ of column conductors in each bit array is equal to the number of groups.

5. A random-access memory organization for the storage of $m$ words each having $n$ bits, comprising $n$ bit arrays of $m$ memory elements each, each array of memory elements being linked by row drive conductors and column drive conductors, means connecting in series the corresponding row drive conductors of all said bit arrays, row decoder and driver means to select and drive any one of the series-connected drive conductors in all $n$ of said bit arrays, column decoder and driver means to select and drive any one of the column drive conductors in all of said bit arrays, and $n$ inhibit-sense means each linked with all memory elements of a respective bit array, wherein the improvement comprises the partitioning of said bit arrays into a number of groups, the serial connection of corresponding column drive conductors of the bit arrays within each group, and the provision of a separate column decoder and driver for each of said groups.

6. A memory organization as defined in claim 5 wherein the ratio of the number of row conductors to the number of column conductors in each bit array is equal to the number of said groups.

References Cited

UNITED STATES PATENTS

| | | | |
|---|---|---|---|
| 2,776,419 | 1/1957 | Rajachman et al. | 340—174 |
| 2,902,677 | 9/1959 | Counihan | 340—174 |
| 3,161,860 | 12/1964 | Grooteboer | 340—174 |
| 3,317,902 | 5/1967 | Michael | 340—174 |

STANLEY M. URYNOWICZ, Jr., Primary Examiner